(12) United States Patent
Hsieh

(10) Patent No.: US 11,181,212 B2
(45) Date of Patent: Nov. 23, 2021

(54) AXIALLY EXTENSIBLE HOSE APPARATUS

(71) Applicant: Yuan Pin Industrial Co., Ltd., Ho-Mei Township, Chang-Hua County (TW)

(72) Inventor: Ming-Chih Hsieh, Ho-Mei Township (TW)

(73) Assignee: Yuan Pin Industrial Co., Ltd., Ho-Mei Township (TW)

( * ) Notice: Subject to any disclaimer, the term of this patent is extended or adjusted under 35 U.S.C. 154(b) by 70 days.

(21) Appl. No.: 16/822,449

(22) Filed: Mar. 18, 2020

(65) Prior Publication Data
US 2020/0300388 A1 Sep. 24, 2020

(30) Foreign Application Priority Data
Mar. 22, 2019 (DE) .......................... 102019107481.9

(51) Int. Cl.
*F16L 11/04* (2006.01)
*F16L 11/08* (2006.01)
*F16L 11/12* (2006.01)

(52) U.S. Cl.
CPC ............. *F16L 11/085* (2013.01); *F16L 11/12* (2013.01); *F16L 11/04* (2013.01)

(58) Field of Classification Search
CPC . F16L 11/00; F16L 11/12; F16L 11/04; B32B 5/02; B32B 5/022; B32B 3/28
USPC ................. 138/118, 119, 123–126, 137, 140
See application file for complete search history.

(56) References Cited

U.S. PATENT DOCUMENTS

| | | | | |
|---|---|---|---|---|
| 6,024,132 A | * | 2/2000 | Fujimoto | F16L 11/15 138/118 |
| 8,291,941 B1 | * | 10/2012 | Berardi | F16L 11/20 138/118 |
| 8,479,776 B2 | * | 7/2013 | Berardi | F16L 11/00 138/118 |
| 9,127,791 B2 | * | 9/2015 | Ragner | D03D 3/06 |
| 9,810,357 B2 | * | 11/2017 | Blanchette | F16L 11/12 |
| 9,863,565 B2 | * | 1/2018 | LaTulippe | B32B 25/08 |
| 9,964,239 B2 | * | 5/2018 | Disbrow | F16L 11/20 |
| 10,094,493 B2 | * | 10/2018 | Disbrow | F16L 11/12 |
| 10,927,983 B2 | * | 2/2021 | Mezzalira | F16L 11/12 |

* cited by examiner

*Primary Examiner* — Patrick F Brinson
(74) *Attorney, Agent, or Firm* — Karin L. Williams; Alan D. Kamrath; Mayer & Williams PC

(57) ABSTRACT

An extensible hose includes a hose, a protective tube and a sheath. The hose is expansible in a radial manner and extensible in an axial manner. The protective tube is expansible in a radial manner and extensible in an axial manner, wherein the protective tube wraps the hose. The sheath wraps the protective tube. The sheath includes elastic warps and non-elastic weft. The elastic warps extend parallel to the protective tube. The non-elastic wefts sorted into a first group and a second group. The non-elastic wefts in the first group extend around the elastic warps in a right-hand helical manner and in an S-shaped manner. The non-elastic wefts in the second group extend around the elastic warps in a left-hand helical manner and in an S-shaped manner.

5 Claims, 11 Drawing Sheets

AXIALLY EXTENSIBLE HOSE APPARATUS

BACKGROUND OF INVENTION

1. Field of Invention

The present invention relates to a hose and, more particularly, to a hose that is axially extensible due to water pressure.

2. Related Prior Art

A conventional hose apparatus that is axially extensible because of water pressure includes an elastic hose inserted in a non-elastic woven sheath. Creases or wrinkles inevitably occur on the woven sheath when the woven sheath shrinks with the elastic hose. The creases render the hose apparatus aesthetically unpleasant. Moreover, the creases inevitably increase a transverse dimension of the woven sheath, and the increased transverse dimension affects the reeling of the hose apparatus. Furthermore, the creases are weak points of the hose apparatus and would very likely burst after some time of use. The burst woven sheath could not properly support the elastic hose and the elastic hose could burst because of water pressure.

The present invention is therefore intended to obviate or at least alleviate the problems encountered in prior art

SUMMARY OF INVENTION

It is the primary objective of the present invention to provide an aesthetically pleasant and robust extensible hose apparatus.

To achieve the foregoing objective, the extensible hose includes a hose, a protective tube and a sheath. The hose is expansible in a radial manner and extensible in an axial manner. The protective tube is expansible in a radial manner and extensible in an axial manner, wherein the protective tube wraps the hose. The sheath wraps the protective tube. The sheath includes elastic warps and non-elastic weft. The elastic warps extend parallel to the protective tube. The non-elastic wefts sorted into a first group and a second group. The non-elastic wefts in the first group extend around the elastic warps in a right-hand helical manner and in an S-shaped manner. The non-elastic wefts in the second group extend around the elastic warps in a left-hand helical manner and in an S-shaped manner.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
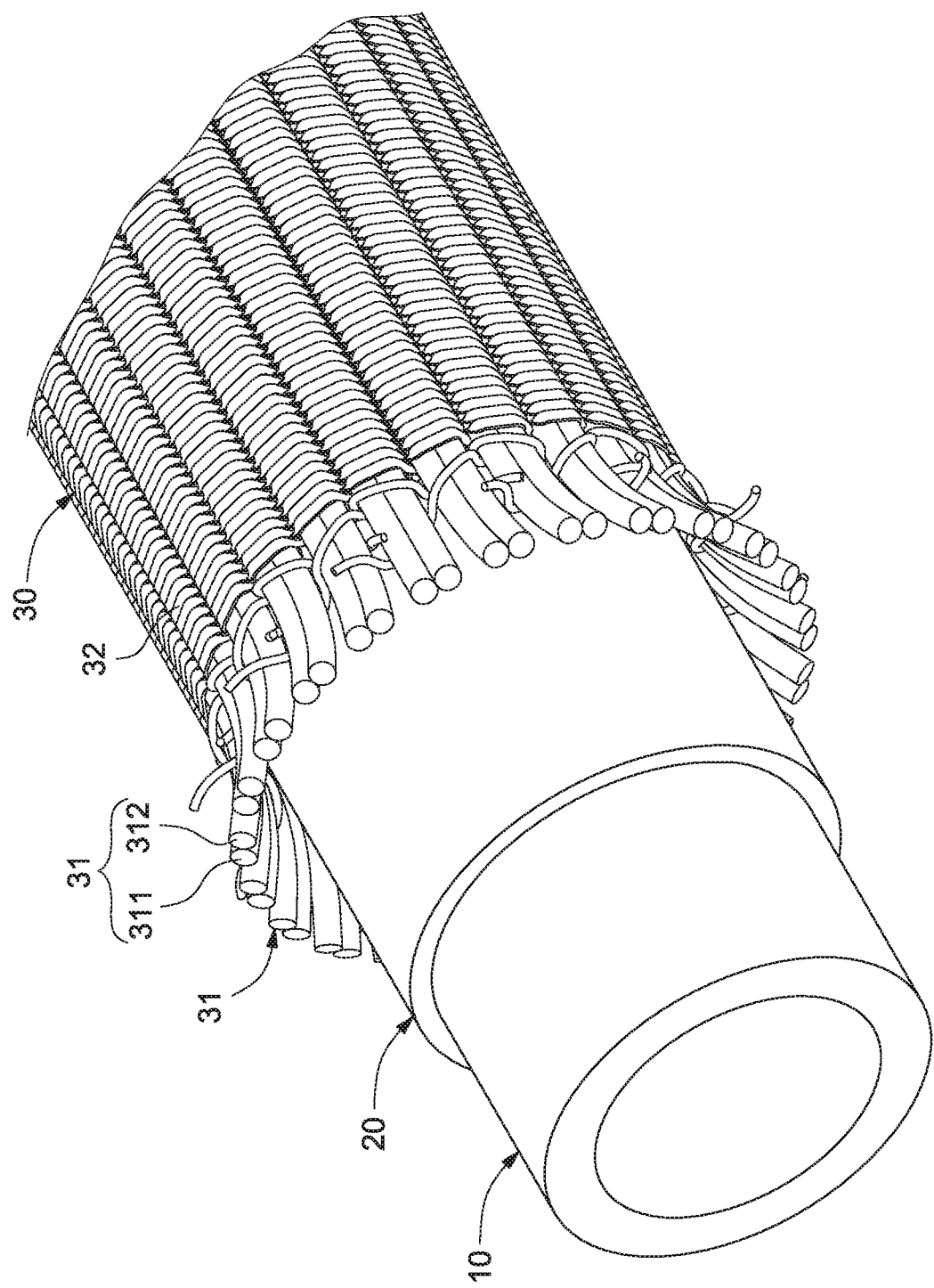
FIG. 1 is a perspective view of an extensible hose apparatus according to the first embodiment of the present invention.

Referring to FIGS. 1 through 7, an extensible host apparatus includes a hose 10, a protective tube 20 for wrapping the hose 10, and a sheath 30 for wrapping the protective tube 20 according to a first embodiment of the present invention. The sheath 30 is tubular woven element.

The hose 10 is made of a material that is expansible in a radial (or "circumferential") direction and extensible in an axial (or "longitudinal") direction. The elastic material of the hose 10 can be latex or thermoplastic elastomer ("TPE") for example.

The protective tube 20 is made of a material that is expansible in a radial direction and extensible in an axial direction. The material of the protective tube 20 can be thermoplastic polyurethanes ("TPU") for example. The protective tube 20 wraps the hose 10. The protective tube 20 is made with thickness that is smaller than that of the hose 10.

Preferably, a high-speed braiding machine is used to make the sheath 30 around and along the protective tube 20 so that the sheath 30 wraps the protective tube 20. The sheath 30 includes elastic warps 31 and non-elastic wefts 32. The elastic warps 31 extend parallel to the axial direction of the protective tube 20.

The non-elastic wefts 32 are sorted into two groups. The first group extends around the protective tube 20 in a right-hand helical manner. The second group around the protective tube 20 in a left-hand helical manner.

In the first embodiment, the elastic warps 31 are sorted into groups, with each group including two elastic wraps 311 and 312. However, each group can include three warps 31 or more.

The non-elastic wefts 32 extend past the groups of elastic warps 311 and 312 in an S-shaped manner. Each of the non-elastic wefts 32 includes alternately arranged under-lying sections and exposed sections. Each of the under-lying sections extends between the protective tube 20 and a group of elastic warps 311 and 312. Each of the exposed sections extends on an external side of an adjacent group of elastic warps 311 and 312. Thus, the non-elastic wefts 32 tightly squeeze the pairs of elastic warps 311 and 312.

Figure 2:
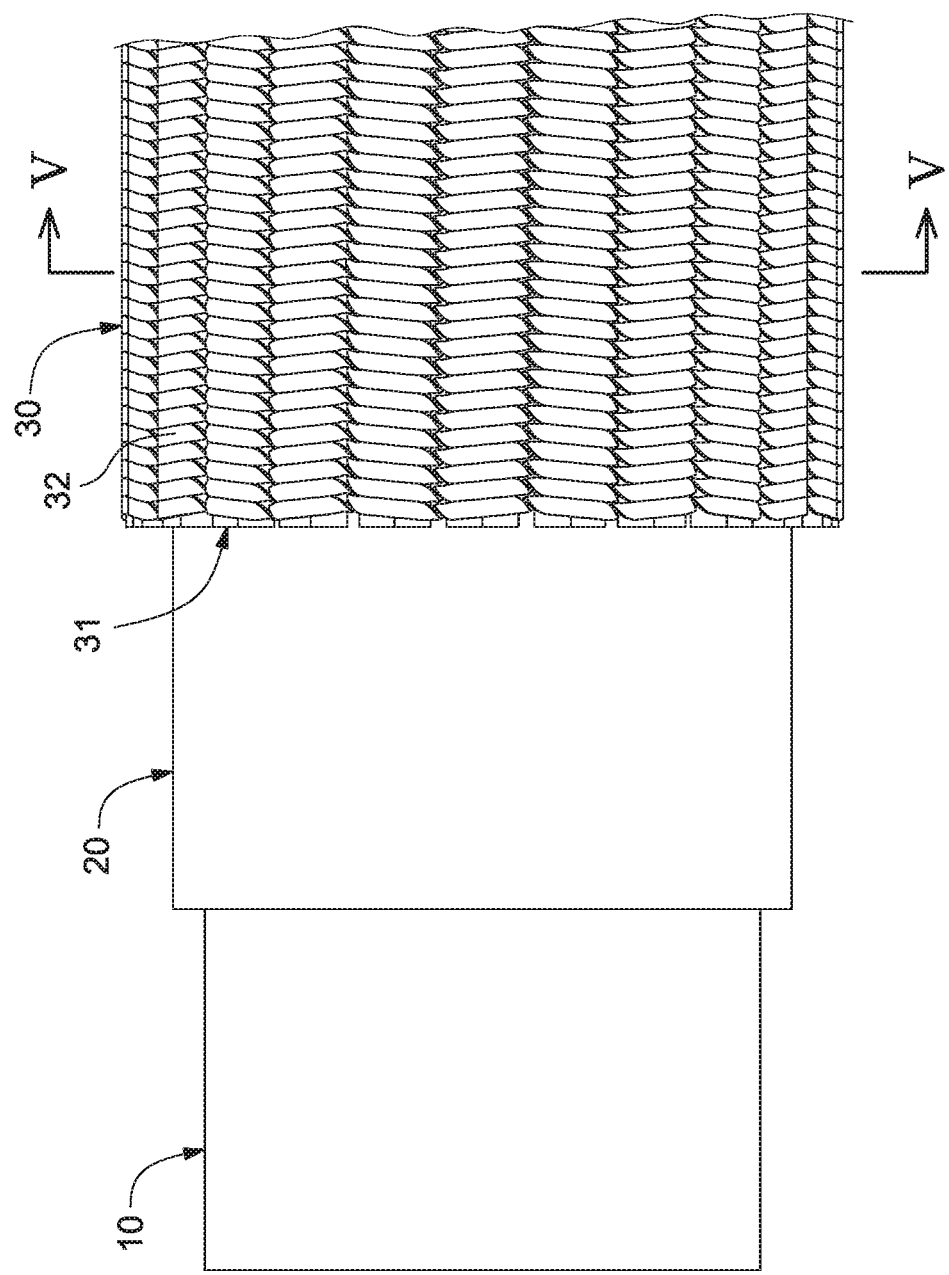
FIG. 2 is a side view of the extensible hose apparatus shown in FIG. 1.
Figure 3:
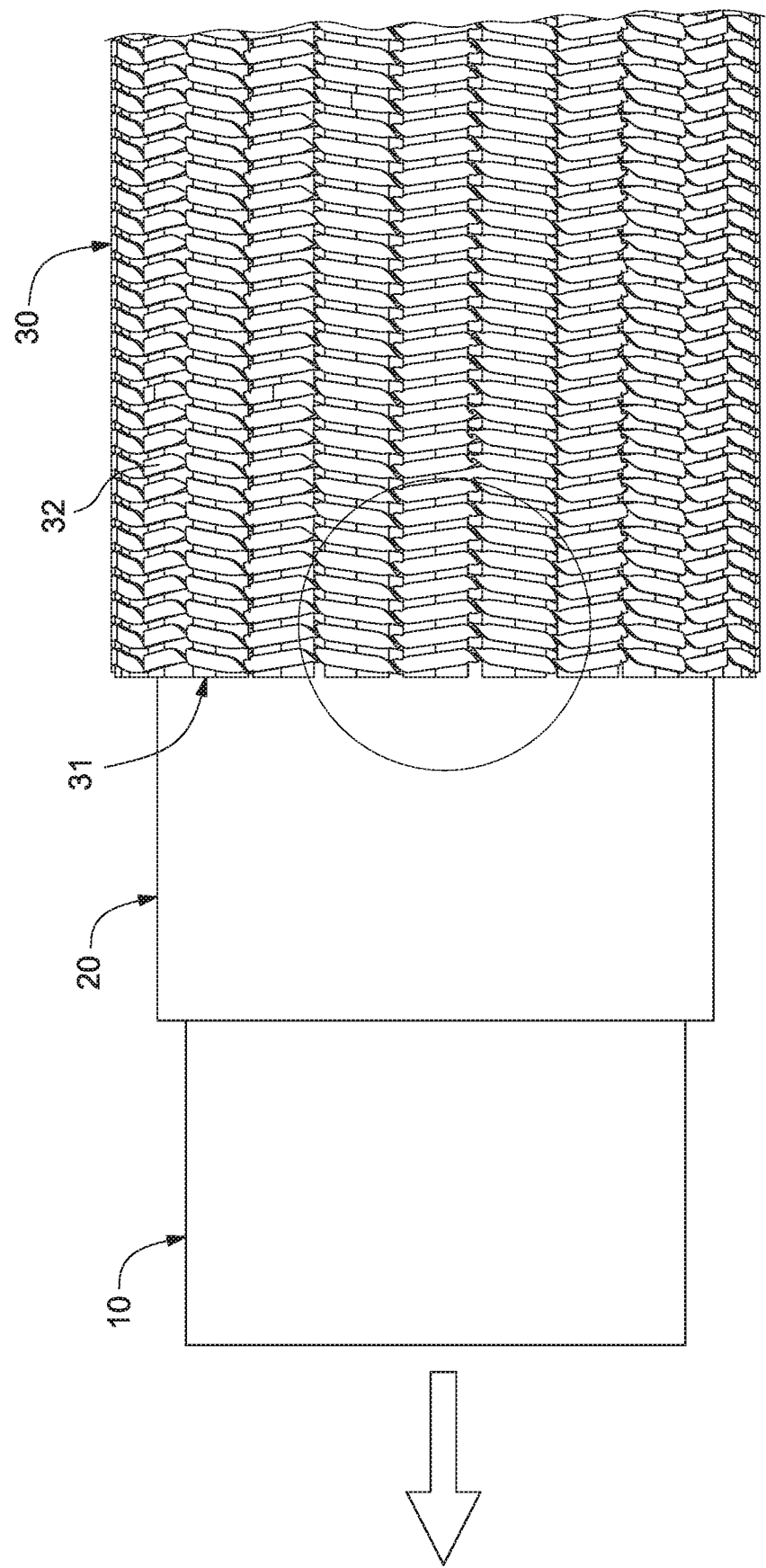
FIG. 3 is a side view of the extensible hose apparatus in another position than shown in FIG. 2.
Figure 4:
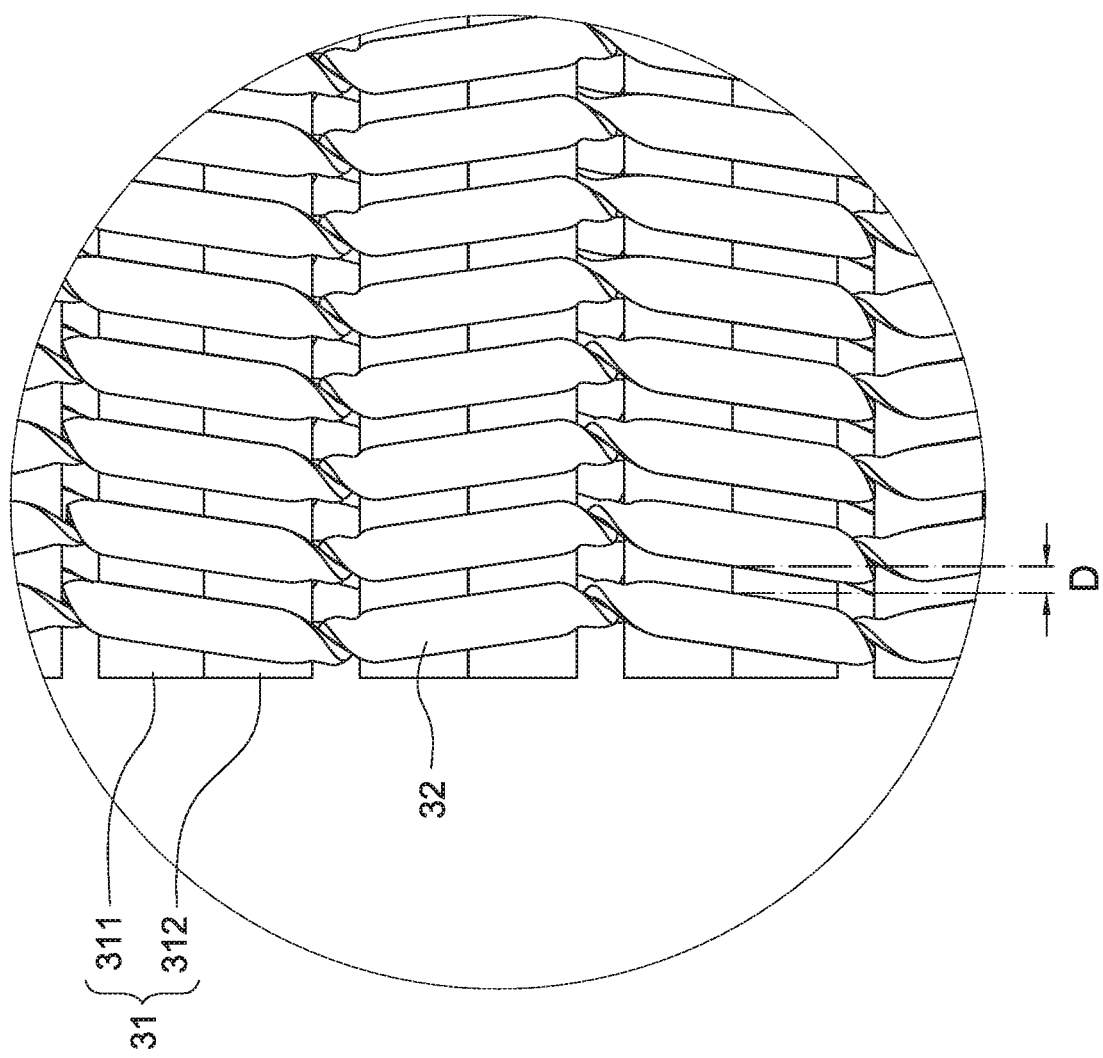
FIG. 4 is an enlarged partial view of the extensible hose apparatus shown in FIG. 3.
Figure 5:
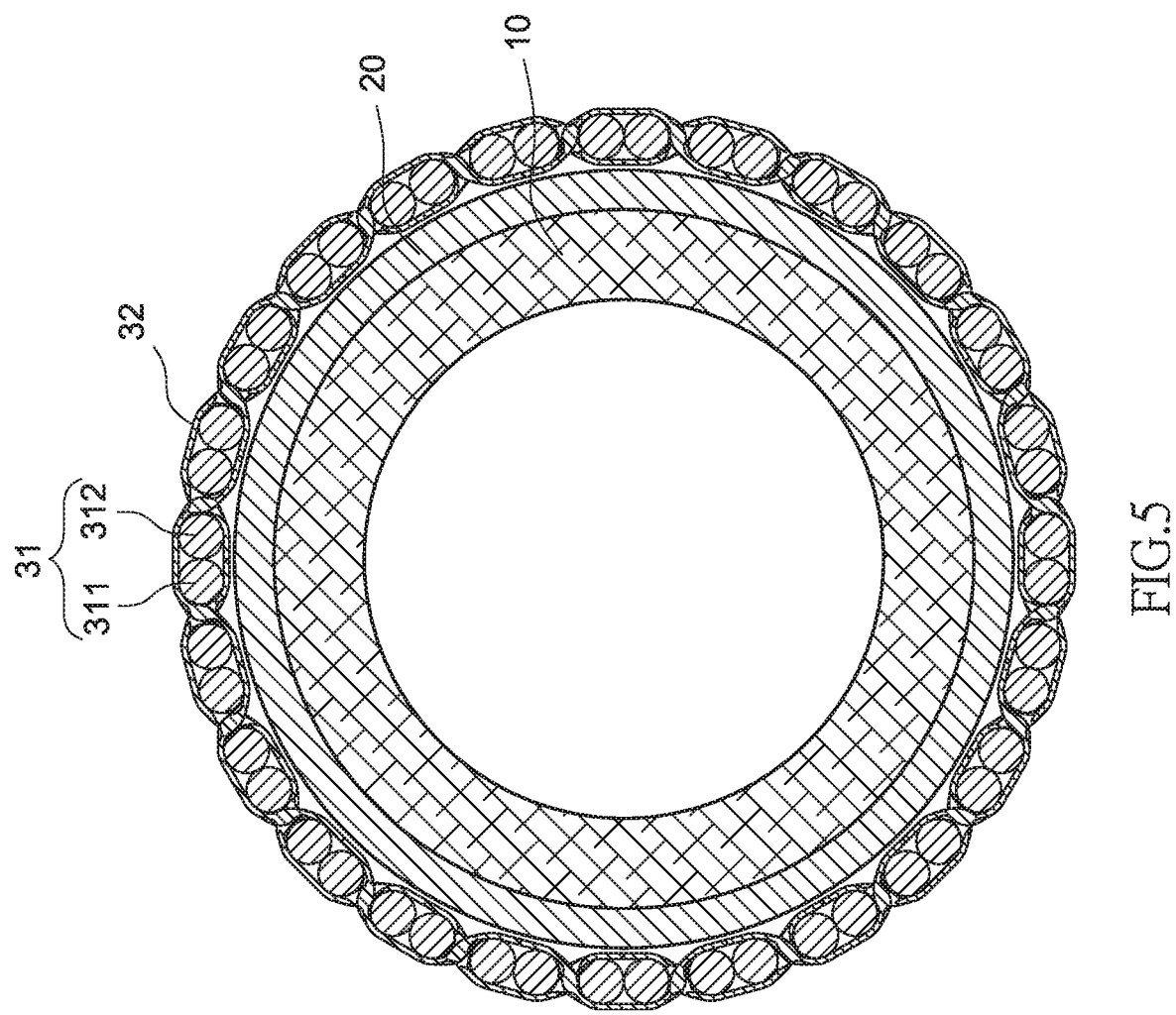
FIG. 5 is a cross-sectional view of the extensible hose apparatus taken along a line V-V shown in FIG. 2.
Figure 6:
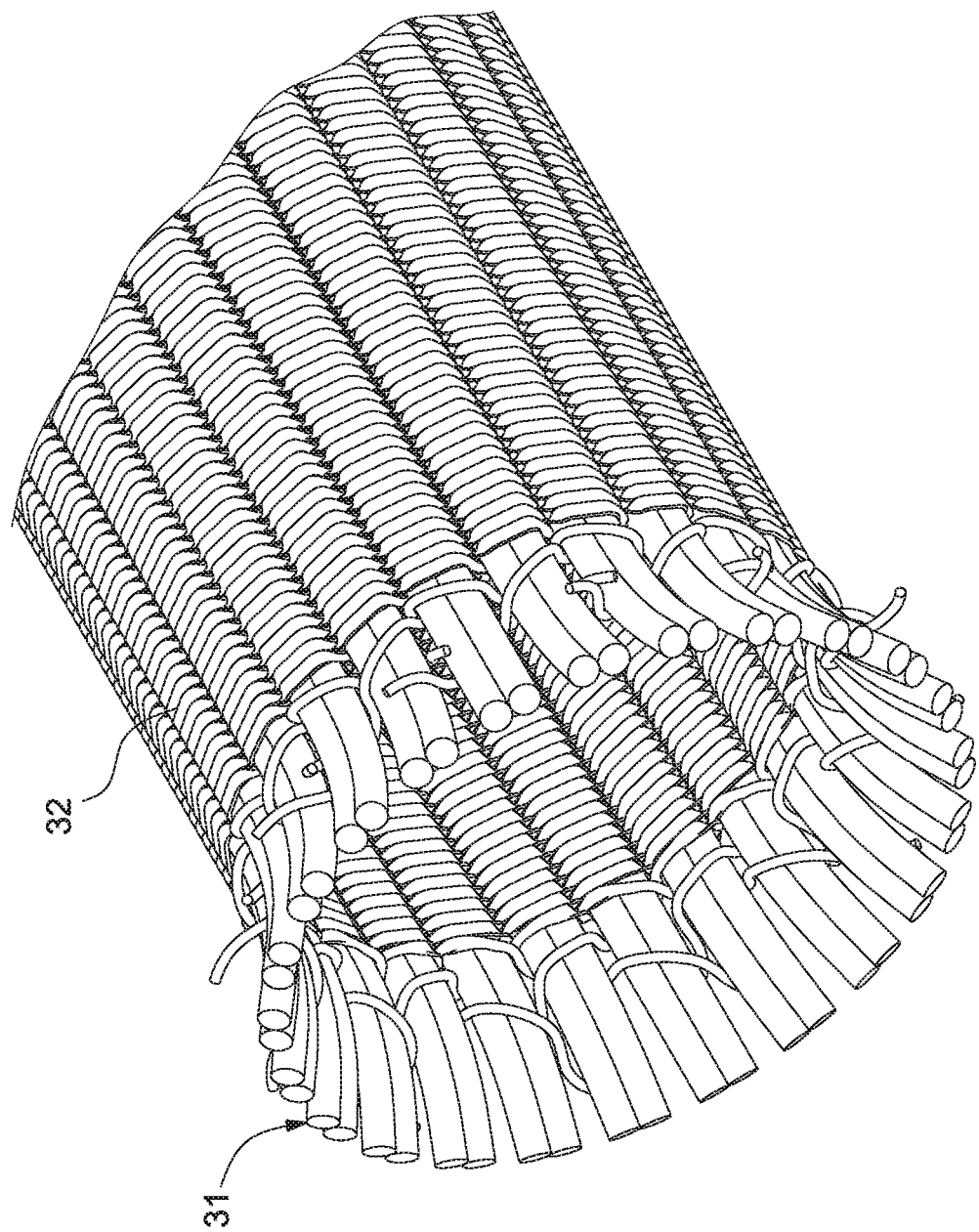
FIG. 6 is an enlarged view of a sheath of the extensible hose apparatus shown in FIG. 1.
Figure 7:
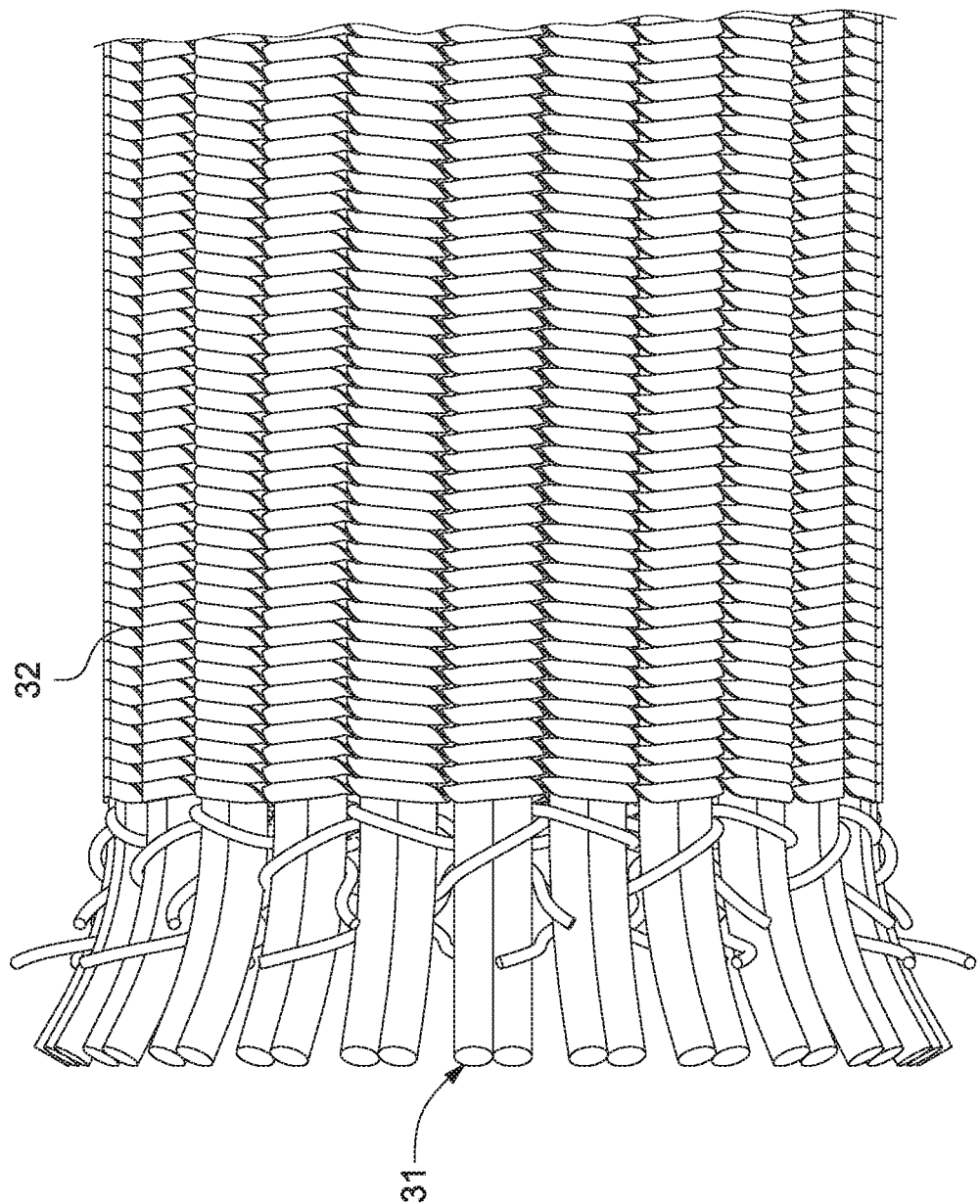
FIG. 7 is a side view of the sheath shown in FIG. 6.
Figure 8:
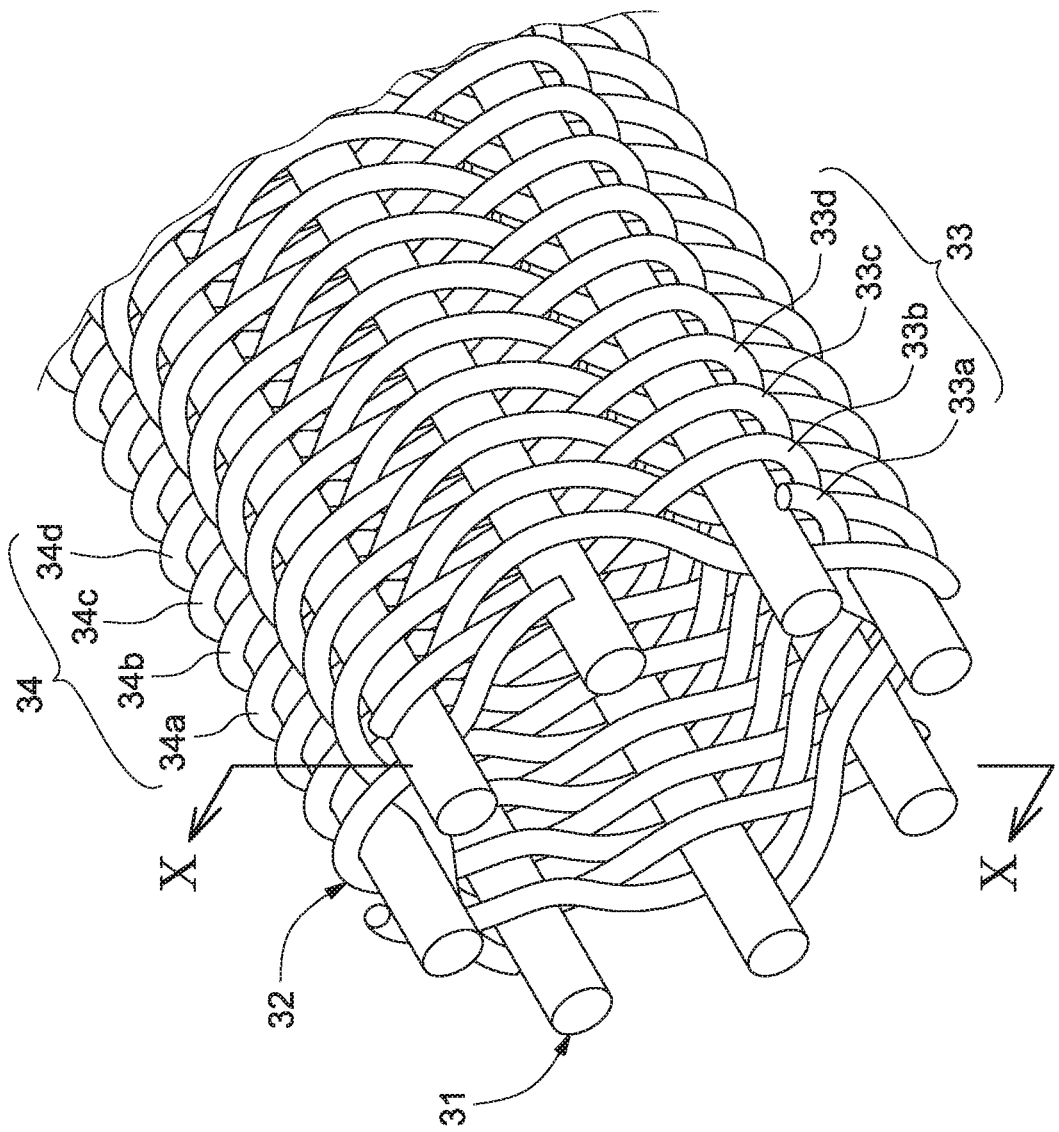
FIG. 8 is a perspective view of a sheath according to the second embodiment of the present invention.
Figure 9:
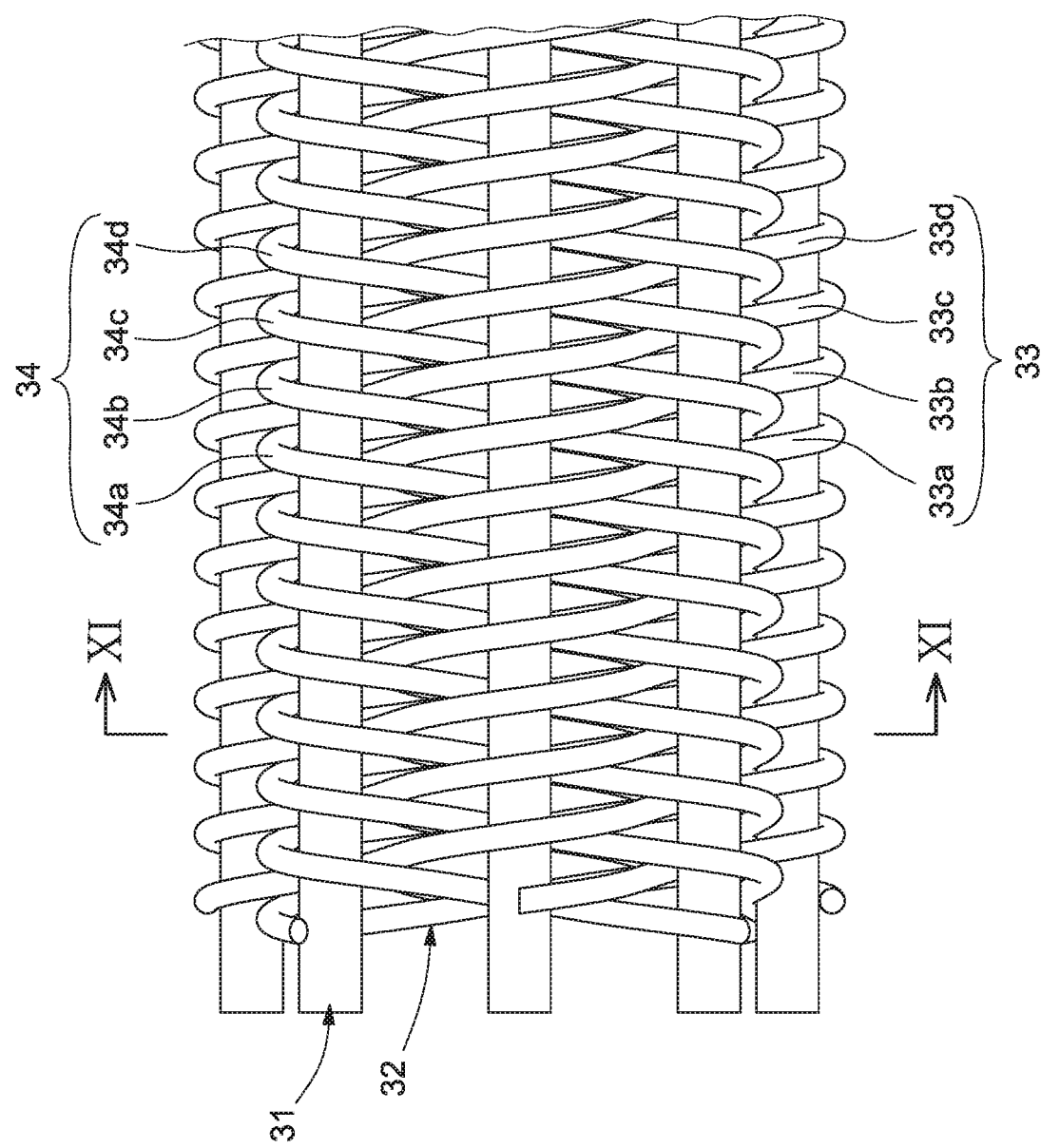
FIG. 9 is a side view of the sheath shown in FIG. 8.
Figure 10:
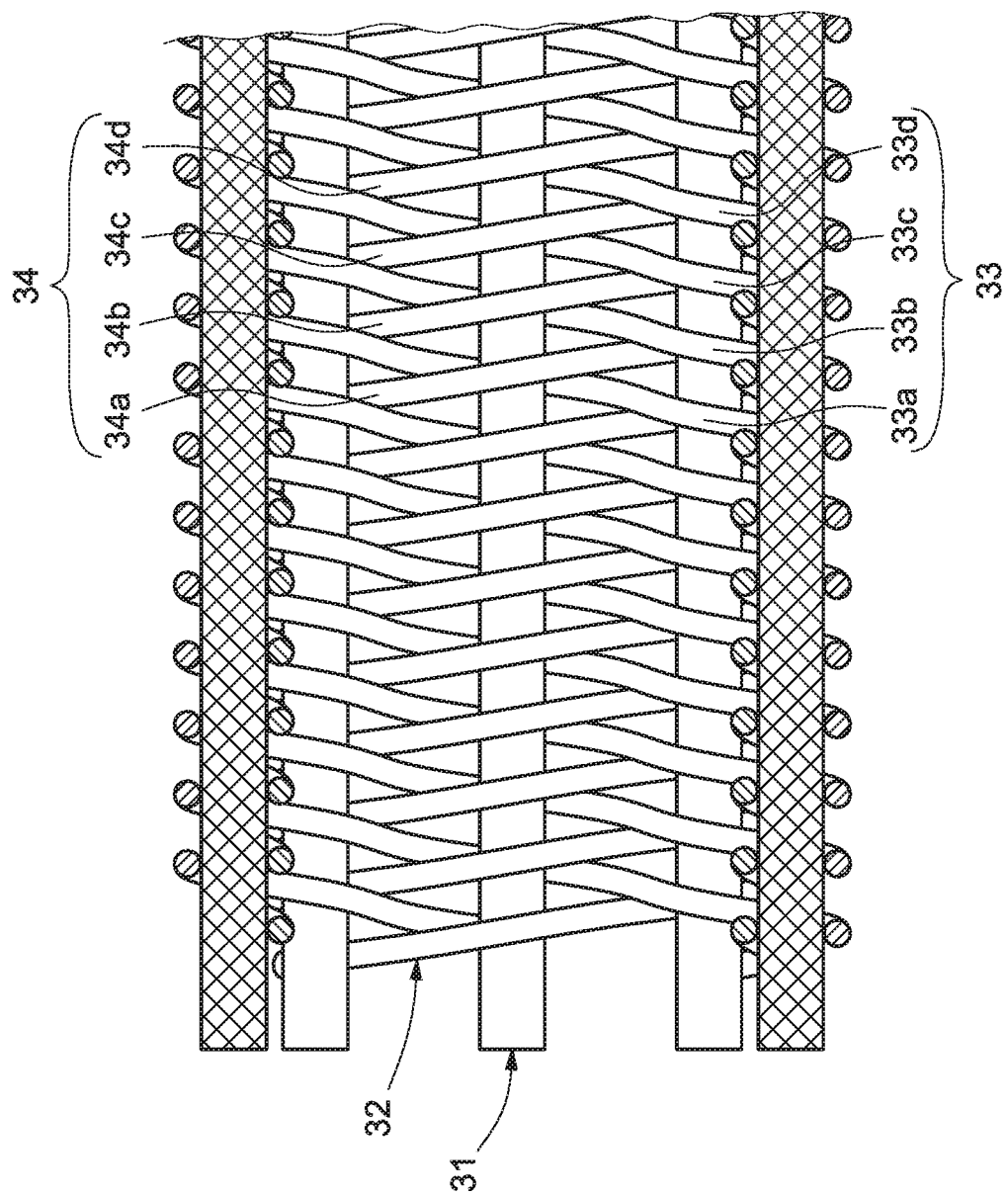
FIG. 10 is a cross-sectional view of the sheath taken along a line X-X shown in FIG. 8.

The hose 10 and the protective tube 20 are allowed to extend axially when water pressure is increased and are allowed to shrink when the water pressure is reduced. The non-elastic wefts 32 of the sheath 30 confine the hose 10 and the protective tube 20 in the radial direction to eliminate or at least limit radial expansion of the hose 10 and the protective tube 20 to a very small range. The elastic warps 31 of the sheath 30 allow the hose 10 and the protective tube 20 to extend and shrink axially. Referring to FIG. 2, the sheath 30 is in a shrunk position. The non-elastic wefts 32 are squeezed against one another. Referring to FIGS. 3 and 4, the sheath 30 is in an extended position. There the non-elastic wefts 32 are separated from one another by a distance D. Referring to FIGS. 3 and 4, the distance D is not long. However, the sheath 30 is extensible for a considerable amount that is many times of the distance D.

Referring to FIGS. 8-11, there is shown a sheath 30 according to a second embodiment of the present invention. The second embodiment is identical to the first embodiment except for that the elastic warps 31 are separated from one another, i.e., not sorted in pairs. As shown, the sheath 30 includes eight non-elastic wefts 32. The non-elastic wefts 32 include two groups 33 and 34 which will be described in detail for example. The first group 33 includes four non-elastic wefts 33*a*, 33*b*, 33*c* and 33*d*. The second group 34 includes four non-elastic wefts 34*a*, 34*b*, 34*c* and 34*d*.

Figure 11:
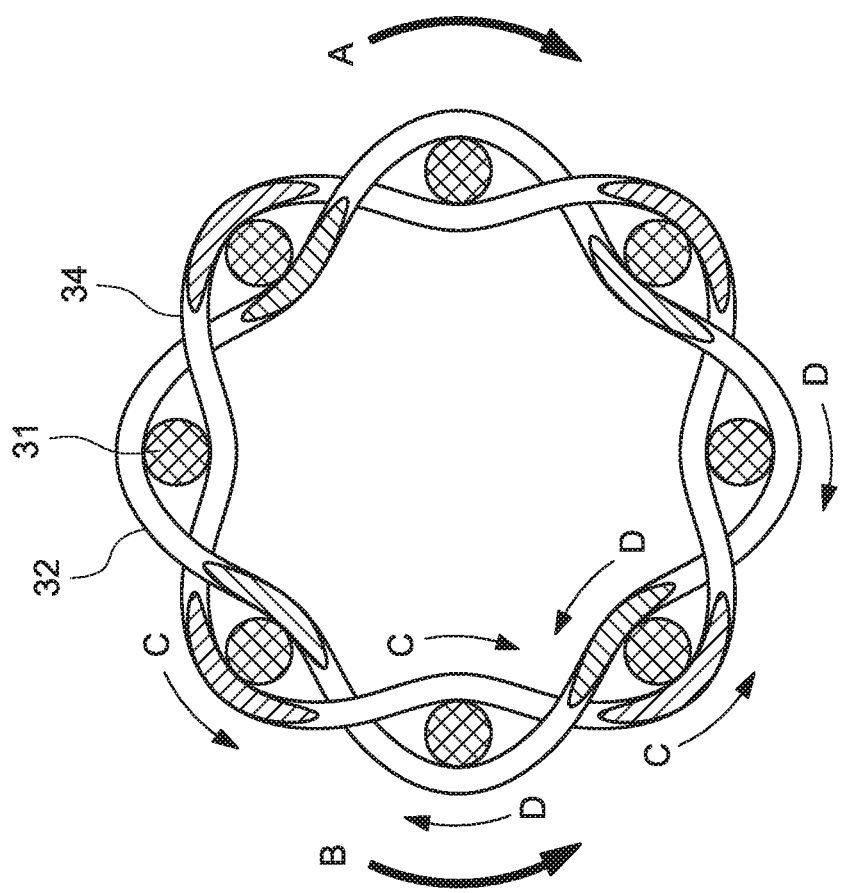
FIG. 11 is a cross-sectional view of the sheath taken along a line XI-XI shown in FIG. 9.

Referring to FIG. 11, the non-elastic wefts 33*a*, 33*b*, 33*c* and 33*d* in the first group 33 extend around the elastic warps 31 in a right-hand helical manner as indicated by an arrow head A. The non-elastic wefts 33*a*, 33*b*, 33*c* and 33*d* in the first group 33 extend around the elastic warps 31 in an S-shaped manner as indicated by arrow heads C.

The non-elastic wefts 34*a*, 34*b*, 34*c* and 34*d* in the second group 34 extend around the elastic warps 31 in a left-hand helical manner as indicated by an arrow head B. The non-elastic wefts 34*a*, 34*b*, 34*c* and 34*d* in the second group 34 extend around the elastic warps 31 in an S-shaped manner as indicated by arrow heads D.

The non-elastic wefts 32 are tightened to squeeze the elastic warps 31 against one another. Thus, the sheath 30 is made.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. An extensible hose comprising:
   a hose expansible in a radial manner and extensible in an axial manner;
   a protective tube expansible in a radial manner and extensible in an axial manner, wherein the protective tube wraps the hose; and
   a sheath for wrapping the protective tube, wherein the sheath comprises:
   elastic warps extending parallel to the protective tube; and
   non-elastic wefts sorted into a first group and a second group, wherein the non-elastic wefts in the first group extend around the elastic warps in a right-hand helical manner and in an S-shaped manner, and the non-elastic wefts in the second group extend around the elastic warps in a left-hand helical manner and in an S-shaped manner.

2. The extensible hose according to claim 1, wherein the protective tube is made with a thickness smaller than that of the hose.

3. The extensible hose according to claim 1, wherein each of the non-elastic wefts comprises alternatively arranged under-lying sections and exposed sections, and each of the under-lying sections extends between the protective tube and one of elastic warps, and each of the exposed sections extends on an external side of an adjacent one of the elastic warps.

4. The extensible hose according to claim 1, wherein the elastic warps are sorted into groups, with each of the groups comprising at least two elastic warps.

5. The extensible hose according to claim 4, wherein each of the non-elastic wefts comprises alternatively arranged under-lying sections and exposed sections, and each of the under-lying sections extends between the protective tube and one of the groups of elastic warps, and each of the exposed sections extends on an external side of an adjacent group of elastic warps.

\* \* \* \* \*